United States Patent
Slattery

(10) Patent No.: US 7,225,967 B2
(45) Date of Patent: Jun. 5, 2007

(54) STRUCTURAL ASSEMBLIES AND PREFORMS THEREFOR FORMED BY LINEAR FRICTION WELDING

(75) Inventor: Kevin T. Slattery, St. Charles, MO (US)

(73) Assignee: The Boeing Company, Chicago, IL (US)

( * ) Notice: Subject to any disclaimer, the term of this patent is extended or adjusted under 35 U.S.C. 154(b) by 285 days.

(21) Appl. No.: 10/738,594

(22) Filed: Dec. 16, 2003

(65) Prior Publication Data

US 2005/0127140 A1 Jun. 16, 2005

(51) Int. Cl.
*B23K 20/12* (2006.01)
*B23K 31/02* (2006.01)

(52) U.S. Cl. .................................. 228/112.1; 228/2.1
(58) Field of Classification Search ............... None
See application file for complete search history.

(56) References Cited

U.S. PATENT DOCUMENTS

| | | | |
|---|---|---|---|
| 5,031,288 A * | 7/1991 | Sadler ..................... | 29/889.21 |
| 5,248,077 A | 9/1993 | Rhoades et al. | |
| 5,302,414 A | 4/1994 | Alkhimov et al. | |
| 5,366,344 A * | 11/1994 | Gillbanks et al. ....... | 416/213 R |
| 5,460,317 A | 10/1995 | Thomas et al. | |
| 5,469,617 A | 11/1995 | Thomas et al. | |
| 5,486,262 A | 1/1996 | Searle | |
| 5,682,677 A | 11/1997 | Mahoney | |
| 5,697,544 A | 12/1997 | Wykes | |
| 5,718,366 A | 2/1998 | Colligan | |
| 5,718,863 A | 2/1998 | McHugh et al. | |
| 5,769,306 A | 6/1998 | Colligan | |
| 5,794,835 A | 8/1998 | Colligan et al. | |
| 5,813,593 A * | 9/1998 | Galaske, Jr. ............. | 228/112.1 |

(Continued)

FOREIGN PATENT DOCUMENTS

EP 1 048 390 A2 11/2000

(Continued)

OTHER PUBLICATIONS

The Welding Institute; *Leading Edge Friction Hydro Pillar Processing*; Connect; Jun. 1992.

(Continued)

*Primary Examiner*—Lynne R. Edmondson
(74) *Attorney, Agent, or Firm*—Alston & Bird LLP

(57) ABSTRACT

A structural assembly and a preform and method for forming the structural assembly are provided. The preform can be formed by linear friction welding structural members to a base member and friction welding each structural member to at least one of the other structural members. The resulting preform can be formed with dimensions and a configuration that approximate the dimensions and configuration of the structural assembly. Thus, the structural assembly can be formed by joining multiple members that are generally smaller than the finished assembly.

20 Claims, 6 Drawing Sheets

U.S. PATENT DOCUMENTS

| | | | |
|---|---|---|---|
| 5,865,364 A | 2/1999 | Trask et al. | |
| 5,971,247 A | 10/1999 | Gentry | |
| 5,975,406 A | 11/1999 | Mahoney et al. | |
| 6,050,474 A | 4/2000 | Aota et al. | |
| 6,068,178 A | 5/2000 | Michisaka | |
| 6,070,784 A | 6/2000 | Holt et al. | |
| 6,095,402 A | 8/2000 | Brownell et al. | |
| 6,102,272 A * | 8/2000 | Searle et al. | 228/2.1 |
| 6,106,233 A * | 8/2000 | Walker et al. | 416/213 R |
| 6,168,066 B1 | 1/2001 | Arbegast | |
| 6,173,880 B1 | 1/2001 | Ding et al. | |
| 6,216,765 B1 | 4/2001 | Tseng et al. | |
| 6,244,495 B1 * | 6/2001 | Rapp et al. | 228/44.3 |
| 6,257,309 B1 | 7/2001 | Kinane et al. | |
| 6,524,072 B1 * | 2/2003 | Brownell et al. | 416/213 R |
| 6,669,447 B2 * | 12/2003 | Norris et al. | 416/224 |
| 6,779,708 B2 * | 8/2004 | Slattery | 228/112.1 |
| 6,910,616 B2 * | 6/2005 | Halley et al. | 228/112.1 |
| 2002/0125297 A1 | 9/2002 | Stol et al. | |
| 2002/0168466 A1 | 11/2002 | Tapphorn et al. | |

FOREIGN PATENT DOCUMENTS

EP          1 057 572 A2     12/2000

OTHER PUBLICATIONS

The Welding Institute; *Thermomechanical material processing by friction*; Connect; Jul./Aug. 1996.

D. L. Hollar, Jr.; Resistance Seam Welding of Thin Copper Foils; Welding Journal; Jun. 1993; pp. 37-40.

\* cited by examiner

STRUCTURAL ASSEMBLIES AND PREFORMS THEREFOR FORMED BY LINEAR FRICTION WELDING

FIELD OF THE INVENTION

This invention relates to friction welding and, more specifically, to friction welding of one or more structural members to form a structural assembly.

BACKGROUND OF THE INVENTION

Structural devices are often formed as assemblies of a number of smaller structural members. Such assembling of individual members may be necessary to form devices that are too large or too complicated to be formed by conventional manufacturing methods. For example, such factors as casting sizes, forging sizes, available plate and block sizes, and the like can limit the size and geometry of the individual structural members that can be manufactured. To form larger or more complex devices, the structural members are typically assembled by joining the individual structural members using a variety of known joining techniques including, for example, mechanical fastening or welding.

Joints formed by mechanical fasteners such as rivets, screws, and bolts typically require an overlap of the structural materials at the joint. The fasteners and the overlap of material result in an increase in weight of the joint and the structural assembly. The joint can also introduce areas of increased stress, for example, around holes drilled for receiving rivets. Alternatively, weld joints can be formed to join the structural members, sometimes requiring little or no overlap of material. However, the formation of conventional weld joints, such as by arc or electron beam welding, can result in undesirable dimensional changes in the structural members. Welding can also introduce porosity or other discontinuities into the structural members or otherwise cause unwanted changes to the material properties of the structural members.

Friction welding has also been proposed as an alternative to conventional welding methods for joining members. Weld joints formed by friction welding generally exhibit refined grain structure as compared to weld joints formed by other conventional weld techniques such as plasma arc welding. Linear friction welding and rotational friction welding can be used to form strong joints without reducing the mechanical characteristics of the joined materials or causing significant dimensional changes. However, each of these conventional friction welding techniques is limited by the dimensions of the structural members and/or the joints to be formed. For example, conventional linear friction welding and rotational friction welding require one member to be moved, i.e., oscillated or rotated, and urged against the other member. Because of the difficulty of moving large structural members, it can be impossible or impractical to join some structural members by these techniques.

Thus, there exists a need for an improved apparatus and method of joining structural members to form structural assemblies. Preferably, the method should enable the manufacture of preforms that approximate the desired dimensions and configuration of the structural assembly and therefore require little machining or other subsequent processing to form the structural assemblies. The method should be adaptable for joining large and/or complex structural members. Further, the method should not add significant weight to the structural assembly, and should minimize dimensional changes and undesirable changes to the material properties of the structural members.

SUMMARY OF THE INVENTION

The present invention provides a preform and method for forming a frictionally welded structural assembly. The method includes linear friction welding structural members to a base member and welding each structural member to one or more of the adjacent structural members. The resulting preform can be formed with dimensions and a configuration that approximate the dimensions and configuration of the structural assembly. Thus, the assembly can be formed from the preform with a reduced amount of machining or other processing, thereby saving time, materials, and energy. Further, the structural assembly can be formed by joining multiple members that are generally smaller than the finished assembly.

According to one embodiment of the present invention, the method includes reciprocatingly moving a first structural member relative to the base member and urging the first structural member against a first surface of the base member. A plasticized region of material is formed between the first structural member and the base member, and the first structural member is thereby linear friction welded to the base member. The first structural member defines a connection surface that extends from the base member at an angle relative to the first surface of the base member. A second structural member can be urged against the connection surface and the base member and reciprocatingly moved to linear friction weld the second structural member to the base member and the first structural member. The connection surface of the first structural member and a corresponding surface of the second structural member can be disposed at an oblique angle relative to the first surface of the base member. Additional structural members can also be friction welded to the base member and one or more of the other structural members. After the structural members are welded to the base member, the base member and/or the structural members can be machined to the predetermined configuration of the structural assembly. The base members and structural members can be formed of materials such as aluminum, aluminum alloys, titanium, titanium alloys, steel, nickel-based alloys, copper-based alloys, and beryllium-based alloys.

According to another embodiment of the present invention, first and second structural members can be linear friction welded to a base member so that the two structural members define a space therebetween. For example, the first and second structural members can have connection surfaces disposed so that the space tapers in a direction toward the base member. A third structural member can then be linear friction welded to the base member and the first and second structural members in the space between the first and second structural members.

According to yet another embodiment of the present invention, first and second structural members can be linear friction welded to a base member so that connection surfaces of the structural members are directed in an opposing configuration to define an interface therebetween. A rotating friction stir welding pin can be urged through the structural members to form a friction stir weld joint that extends generally along the interface and joins the first and second structural members. According to one aspect of the invention, the friction stir welding tool is urged along a path that is not parallel to the interface. Also, the structural members can be positioned with a space at the interface, and the space can be filled with plasticized material during the friction stir welding operation.

The present invention also provides a preform for forming a structural assembly of a predetermined configuration. The preform includes a base member and structural members that are connected by linear friction weld joints to the base member. The adjacent structural members also define correspondingly angled connection surfaces that are connected by a friction weld joint such as a linear friction weld joint or friction stir weld joint. Advantageously, the base and structural members can be configured to correspond to the predetermined configuration of the structural assembly. The base member and the structural members can be formed of materials such as aluminum, aluminum alloys, titanium, titanium alloys, steel, nickel-based alloys, copper-based alloys, and beryllium-based alloys.

BRIEF DESCRIPTION OF THE DRAWINGS

The foregoing and other advantages and features of the invention, and the manner in which the same are accomplished, will become more readily apparent upon consideration of the following detailed description of the invention taken in conjunction with the accompanying drawings, which illustrate preferred and exemplary embodiments, but which are not necessarily drawn to scale, wherein.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 3:
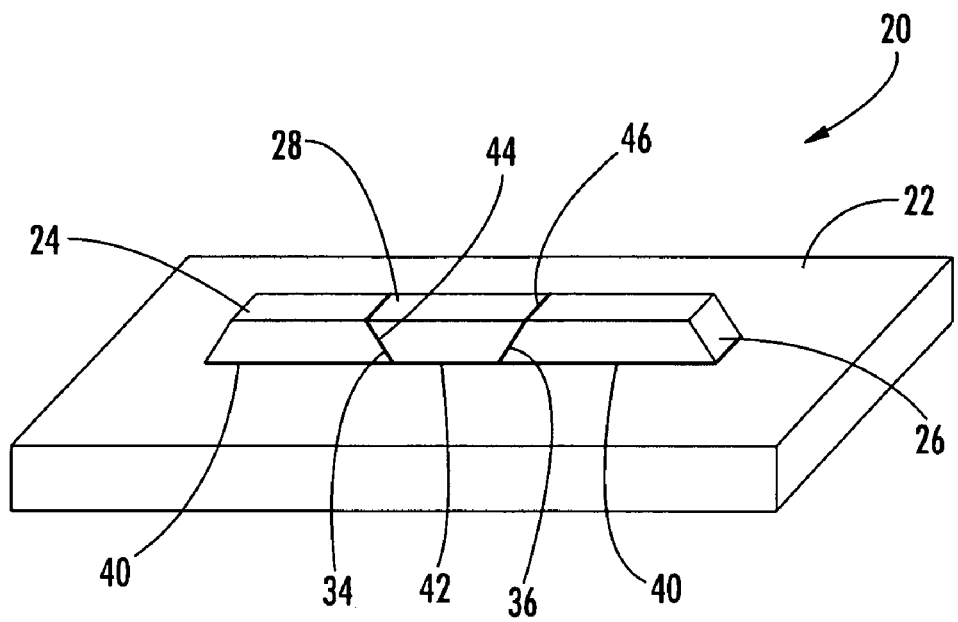
FIG. 3 is a perspective view illustrating a preform made with the base member and structural members shown in FIG. 2, according to one embodiment of the present invention.
Figure 4:
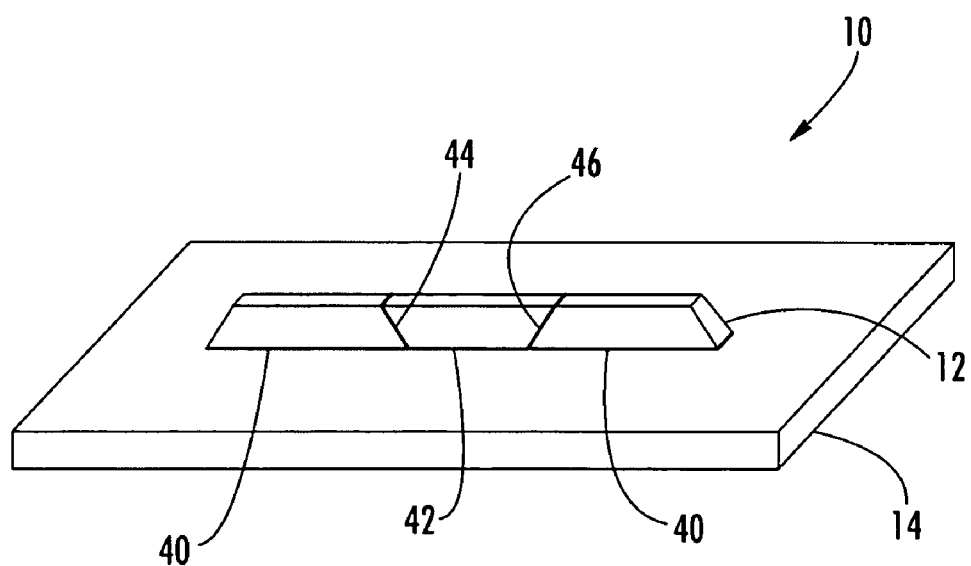
FIG. 4 is a perspective view illustrating a structural assembly made with the preform of FIG. 3 according to one embodiment of the present invention.

Referring to the drawings and, in particular, to FIGS. 1–4, there is illustrated a base member 22 and structural members 24, 26, 28 for use in manufacturing a structural assembly 10 according to one embodiment of the present invention. The structural assembly 10 illustrated in FIG. 4 includes a flange portion 12 that extends perpendicularly from a web portion 14. The structural assemblies formed according to the present invention can be formed from preforms, i.e., assemblies of multiple structural members that approximate the desired finished shape of the structural assembly, and which can be machined or otherwise trimmed to the finished shape. For example, FIG. 3 illustrates a preform 20, i.e., a partially formed structural assembly 10 before being machined or otherwise trimmed to the desired configuration of the structural assembly 10 as illustrated in FIG. 4.

The structural assemblies 10 of the present invention can be formed from any number of structural members depending on the desired dimensions and configuration of the structural assembly 10. Further, the configuration and material composition of the structural members can be formed and selected according to the specifications and design requirements of the structural assembly 10. For example, as illustrated in FIGS. 3 and 4, the web portion 14 of the assembly 10 is formed from the base member 22, and the flange portion 12 is formed from the structural members 24, 26, 28 that are connected to the base member 22.

Figure 1:
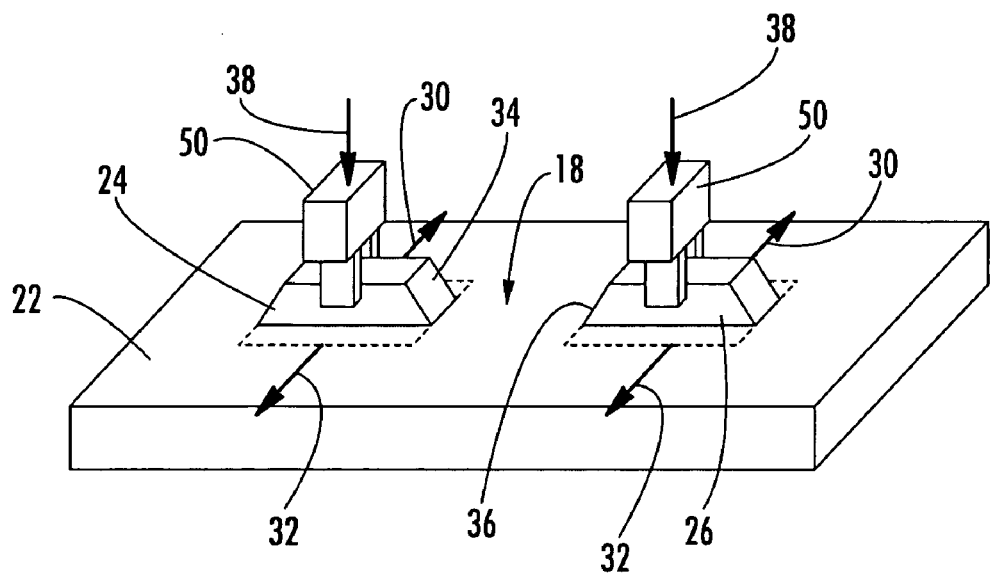
FIG. 1 is a perspective view illustrating a partially formed preform according to one embodiment of the present invention.
Figure 2:
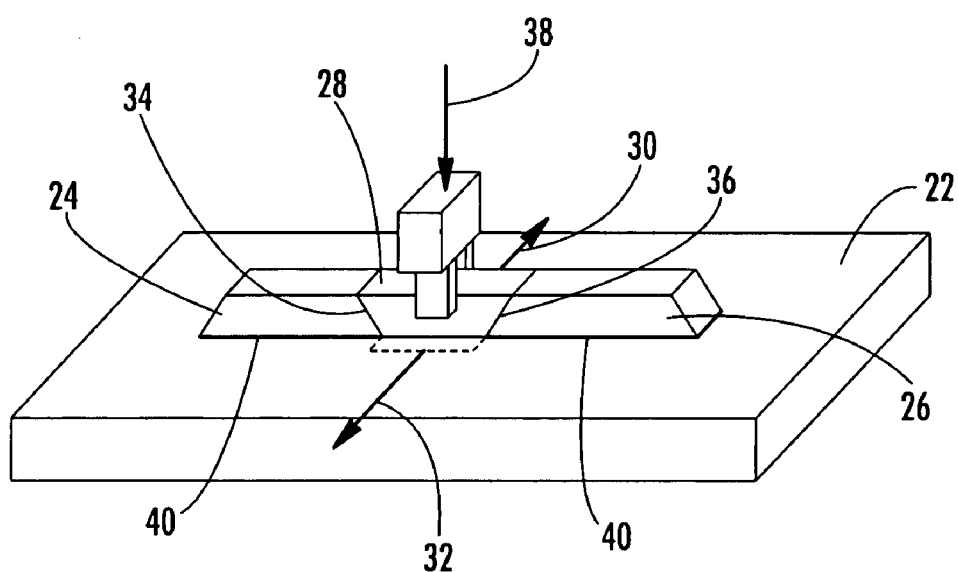
FIG. 2 is a perspective view illustrating the partially formed preform of FIG. 1, shown with a third structural member.

The base member 22 illustrated in FIG. 1 is a generally planar member and each of the structural members 24, 26, 28 extending therefrom is generally trapezoidal. In other embodiments of the invention, however, the structural members 24, 26, 28 can define other configurations including irregular geometric configurations. Similarly, the base member 22 can alternatively be formed of non-planar members. Advantageously, each of the base member 22 and the structural members 24, 26, 28 can be standard stock members or stock members that have been modified. For example, each of the structural members 24, 26, 28 and the base member 22 can be, or can be formed from, blocks or plates that have rectangular or square cross-sections, tubes and cylinders having circular or oval cross-sections, plates, angles or channels having a variety of cross-sectional shapes, or the like. As is known in the art, the base and structural members 22, 24, 26, 28 can be formed from a variety of fabricating processes including milling, casting, die or hand forging, extruding, rolling, and machining. The base and structural members 22, 24, 26, 28 can be formed from materials having high strength to weight ratios and good corrosion resistance. For purposes of example only and not limitation, the structural assembly 10 can comprise aluminum, aluminum alloys, titanium, titanium alloys, steel, nickel-based alloys, copper-based alloys, beryllium-based alloys, or mixtures thereof. Further, the base and structural members 22, 24, 26, 28 can be formed from similar or dissimilar materials.

In addition to the material composition and properties of the base and structural members 22, 24, 26, 28 the selection of the members 22, 24, 26, 28 is also based on the desired dimensions of the structural assembly 10 that is to be formed. More specifically, the desired dimensions of the structural assembly 10 can be determined first, and the base and structural members 22, 24, 26, 28 can then be selected so that the resulting preform 20 will correspond in configuration to the structural assembly 10, i.e., the configuration of the preform 20 is such that material can be machined or otherwise removed or reconfigured to achieve the dimensions of the finished structural assembly 10. Advantageously, by constructing preforms 20 having dimensions and configurations closely or substantially approximating the predetermined dimensions and configuration of the corresponding structural assembly 10, machining time and material waste can be minimized, making the assemblies 10 more economical to produce. The selection of materials and the subsequent formation of preforms 20 and structural assemblies 10 therefrom are described in U.S. application Ser. No. 10/092,675, titled "Preforms for Forming Machined Structural Assemblies," filed Mar. 7, 2002, which is assigned to the assignee of the present invention and the entirety of which is incorporated herein by reference.

The structural assemblies 10 of the present invention can be used as structural components of a vehicle, such as an aircraft, automobile, or marine craft. For example, the structural members 10 can be panels, spars, beams, or other components that are joined to form a wing, wing support structure, fuselage, and the like of an airplane. Alternatively, the assemblies 10 can be used in buildings, machinery, and the like.

Generally, the structural assembly 10 is formed by connecting the structural members 24, 26, 28 to the base member 22 and connecting the structural members 24, 26, 28 to one another. The base member 22 and/or the structural members 24, 26, 28 can then be machined or otherwise trimmed or processed to the dimensions of the structural assembly 10.

The structural members 24, 26, 28 are connected to the base member 22 by welding and, in particular, the structural members 24, 26, 28 are preferably linear friction welded to the base member 22. For example, as shown in FIG. 1, each of the first and second structural members 24, 26 is linear friction welded to the base member 22 by urging the structural member 24, 26 against a surface of the base member 22 and reciprocatingly moving the structural member 24, 26 against the base member 22. For example, each structural member 24, 26 can be reciprocated in opposite directions 30, 32 while being urged or compressed against the base member 22 in direction 38. The structural members 24 can be urged against the base member 22 and reciprocated by one or more actuators (not shown) such as electric, hydraulic, or pneumatic actuators that are engaged to each structural member 24, 26 by adjustable jaws 50, clamps, a chuck, or another connection device.

The relative motion between each of the structural members 24, 26 and the base member 22 generates frictional heating that plasticizes a portion of the structural member 24, 26 and/or the base member 22. Once sufficient plasticization has occurred, the reciprocating motion of the structural member 24, 26 is terminated. Plasticization can be detected, for example, by mechanical or optical measurements, or friction welding can be continued for a predetermined duration based on such factors as the type of materials being joined, the size or type of the joint to be formed, and the compressive force therebetween. After the motion of the structural member 24, 26 is terminated, the compressive force between the structural member 24, 26 and the base member 22 can be maintained by continuing to urge the structural members 24, 26 in direction 38 against the base member 22 as the structural member 24, 26 and the base member 22 cool to thereby form a friction weld joint 40 between the structural members 24, 26 and the base member 22.

It is appreciated that the forces and ranges of motion required for linear friction welding the structural members 24, 26 to the base member 22 can vary according to such factors as the material of the members 22, 24, 26, the dimensions of the members 22, 24, 26, the surface finishes of the members, and the like. For example, according to one embodiment of the present invention, in which the members 22, 24, 26 are formed of aluminum, each of the structural members 24, 26 is urged in direction 38 against the base member 22 with a force sufficient to provide a pressure of about 20,000 psi between the structural member 24, 26 and the base member 22. The structural members 24, 26 are reciprocated about 0.1 inch alternately in directions 30, 32.

In other embodiments of the invention, the structural members 24, 26 can be reciprocated in other directions while being urged against the base member 22. Further, it is appreciated that while the motion of the structural members 24, 26 is generally linear in the alternating directions, the motion of each structural member 24, 26 can have some nonlinear component of motion, e.g., so that the motion of each structural member 24, 26 defines an elliptical path. Alternatively, the structural members 24, 26 can be connected to the base member 22 by other types of friction weld joints such as rotary friction weld joints. Preforms with rotary friction weld joints and methods therefor are described in U.S. application Ser. No. 10/737,873, entitled "Structural Assemblies and Preforms therefor Formed by Friction Welding," filed concurrently herewith, assigned to the assignee of the present application, and the contents of which is incorporated herein in its entirety by reference.

The first and second structural members 24, 26 are friction welded to the base member 22 with a space 18 therebetween for receiving the third structural member 28. More particularly, as illustrated in FIGS. 1–4, each of the structural members 24, 26 defines a connection surface 34, 36 extending from the base member 22 at an angle relative to the base member 22. For example, the first and second structural members 24, 26 can be trapezoidal, and the connection surfaces 34, 36 can be disposed at an oblique angle relative to the base member 22 so that the space 18 therebetween tapers in a direction toward the base member 22 as shown. The space 18 can define a trapezoidal shape or other tapering shapes, such as a triangular shape or irregularly tapered space 18. Preferably, the space 18 as defined by the base member 22 and the first and second structural members 24, 26 corresponds in shape and dimensions to the third structural member 28, which can also be trapezoidal. Further, the connection surfaces 34, 36 can be shaped after the structural members 24, 26 have been connected to the base member 22, thereby modifying the shape of the space 18. For example, after the structural members 24, 26 have been friction welded to the base member 22, the structural members 24, 26 can be machined so that the space is formed to the desired shape. Thus, the structural members 24, 26 can be disposed as rectilinear or otherwise shaped members and thereafter formed to the trapezoidal shape shown in FIG. 2.

Thereafter, the third structural member 28 is welded to the base member 22 and each of the first and second structural members 24, 26. For example, the third structural member 28 can be linear friction welded to the members 22, 24, 26 by urging the third structural member 28 in direction 38 against the base member 22 and the connection surfaces 34, 36 of the structural members 24, 26 and reciprocatingly moving the third structural member 28 in the directions 30, 32. The third structural member 28 can be grasped by the jaws 50 and actuated by one or more actuators, e.g., the same actuators used to move the other structural members 24, 26. At least a portion of the third structural member 28 and/or the base member 22, first structural member 24, or second structural member 26 is plasticized as previously described to form linear weld joints 42, 44, 46 between the third structural member 28 and each of the base member 22 and the first and second structural members 24, 26.

Thus, each of the structural members 24, 26, 28 is friction welded to the base member 22, and the third structural member 28 joins the first and second structural members 24, 26, as shown in FIG. 3. It is appreciated that any number of the structural members 24, 26, 28 can be connected to one or more of the base members 22 to form the preform 20 and, hence, the structural assembly 10. After all of the structural members 24, 26, 28 are installed, as illustrated in FIG. 3, the partially formed structural assembly 10 comprises the preform 20, which corresponds to the dimensions and configuration of the structural assembly 10 so that the preform 20 can be machined or otherwise trimmed or processed to form the structural assembly 10. The preform 20 can be trimmed by any known means, including using a manual or computer-guided machining device, such as a computer numeric control (CNC) machine. During machining, portions of the base member 22 and/or the structural members 24, 26, 28 can be removed. Preferably, the preform 20 is trimmed according to predetermined dimensions corresponding to a desired configuration of the structural assembly 10, as shown in FIG. 4.

Figure 5:
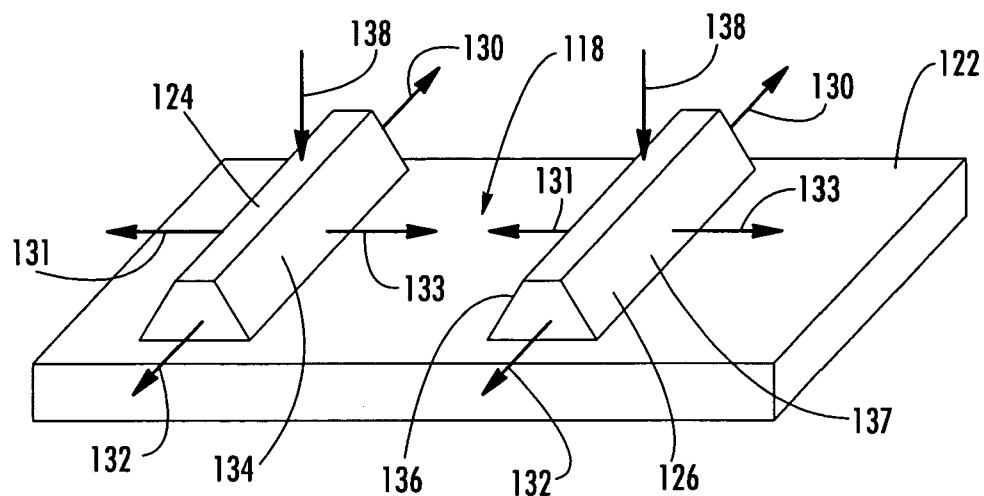
FIG. 5 is a perspective view illustrating a partially formed preform according to another embodiment of the present invention.
Figure 6:
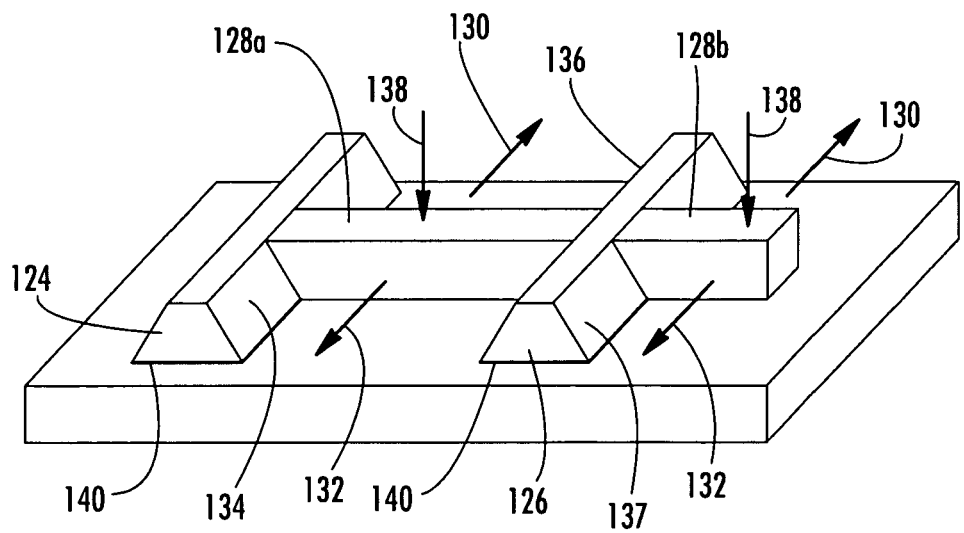
FIG. 6 is a perspective view illustrating the partially formed preform of FIG. 5, shown with two additional structural members.
Figure 7:
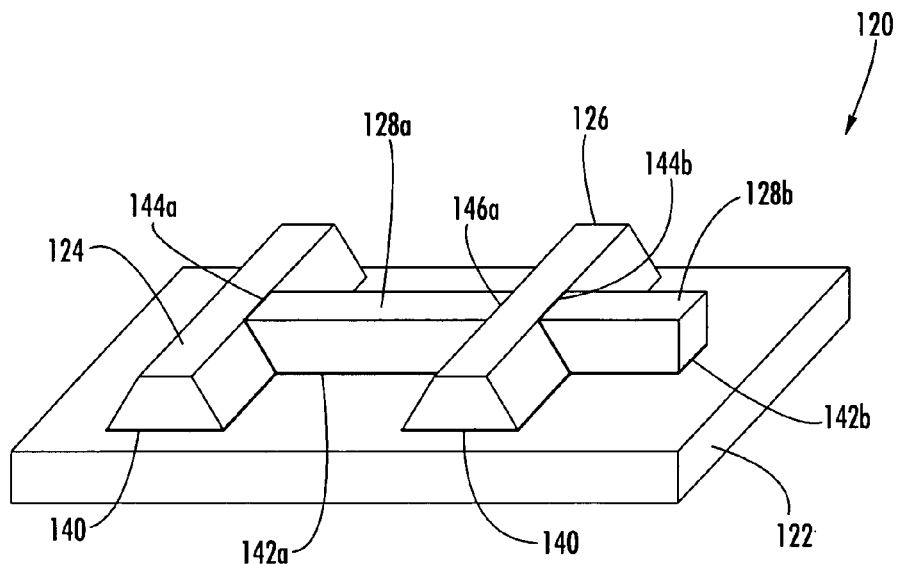
FIG. 7 is a perspective view illustrating a preform made with the base member and structural members shown in FIG. 6 according to one embodiment of the present invention.
Figure 8:
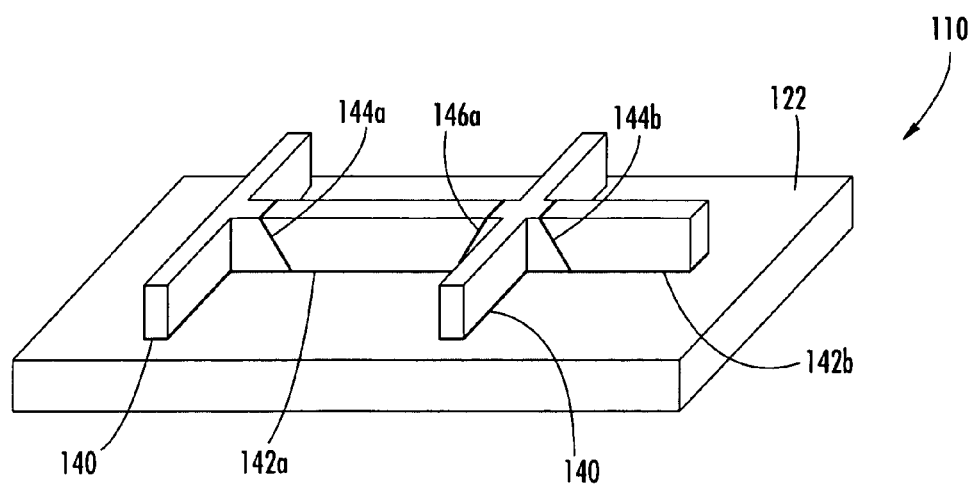
FIG. 8 is a perspective view illustrating a structural assembly made with the preform of FIG. 7 according to one embodiment of the present invention.

FIGS. 5–8 illustrate another embodiment of the present invention in which four structural members 124, 126, 128a, 128b are friction welded to a base member 122 to form a preform 120 (FIG. 7) and, subsequently, a structural assembly 110 (FIG. 8). As shown in FIG. 5, the first and second structural members 124, 126 are linear friction welded to the base member 122 by urging the structural members 124, 126 in direction 138 against the base member 122 and reciprocatingly moving each of the structural members 124, 126. For example, the structural members 124, 126 can be moved alternately in opposite directions 130, 132. Alternatively, the structural members 124, 126 can be alternately moved in opposite directions 131, 133 or other alternate directions. As the structural members 124, 126 are moved against the base member 122, the structural members 124, 126 and/or the base member 122 are partially plasticized. The motion of the structural members 124, 126 is ceased, and the plasticized material cools and hardens to form linear friction weld joints 140 between each of the structural members 124, 126 and the base member 122. Alternatively, each of the first and second structural members 124, 126 can be formed of multiple members that are welded separately to the base member 122. For example, each of the structural members 124, 126 can be formed by linear friction welding multiple members, such as the members 24, 26, 28 described above in connection with FIGS. 1–4, to the base member 122.

Each of the third and fourth structural members 128a, 128b is friction welded to the base member 122 and at least one of the first and second structural members 124, 126. For example, as shown in FIGS. 5 and 6, the first and second structural members 124, 126 define a space 118 therebetween for receiving the third structural member 128a. The third structural member 128a preferably corresponds to the shape and size of the space 118, as defined by base member 122 and connection surfaces 134, 136 of the first and second structural members 124, 126, so that the third structural member 128a can be linear friction welded to the base member 122 and each of the first and second structural members 124, 146, thereby joining the first and second structural members 124, 126. In particular, the first and second structural members 124, 126 can define connection surfaces 134, 136 that at least partially define the space 118. The third structural member 128a can be disposed in the space 118, urged in direction 138, and reciprocatingly moved in the directions 130, 132, as shown in FIG. 6, to form linear friction weld joints 142a, 144a, 146a. The fourth structural member 128b is urged in direction 138 against the base member 122 and another connection surface 137 of the second structural member 124 that defines an angle relative to the base member 122. The fourth structural member 128b is urged against the base member 122 and the second structural member 126 and reciprocatingly moved to form linear friction weld joints 142b, 144b. Thus, the directions 130, 132 of reciprocation of the third and fourth structural members 128a, 128b can be the same as or opposite to the directions of reciprocation of the first and second structural members 124, 126.

The resulting preform 120, shown in FIG. 7, defines a more complex configuration than the preform 20 of FIG. 3. Preferably, the preform 120 corresponds generally to the desired configuration of the structural assembly 110, shown in FIG. 8, so that the structural assembly 110 can be formed by trimming the preform 120 to the desired dimensions. Further, it is appreciated that fewer or greater numbers of the structural members 124, 126, 128a, 128b can be welded to the base member 120 to form the preform 120 and the structural assembly 110. For example, additional structural members similar to the first and second structural members 124, 126 can be linear friction welded to the base member 122 to form additional spaces similar to the space 118. Additional structural members similar to the third and fourth structural members 128a, 128b can be welded in the spaces to the base member 122 and one or more of the structural members previously welded to the base member 122.

In the embodiments illustrated in FIGS. 1–8, the preform 120 and structural assembly 110 are generally formed by linear friction welding structural members 124, 126 to a base member 122 and then linear friction welding additional structural members 128a, 128b to both the base member 122 and the previously welded structural members 124, 126. Thus, each of the structural members 124, 126, 128a, 128b is connected to the base member 122 and the other structural members 124, 126, 128a, 128b by the linear friction weld joints 142a, 142b, 144a, 144b. However, in other embodiments of the present invention, some of the structural members can be joined by connections other than linear friction weld joints. For example, as illustrated FIGS. 9–12, first and second structural members 224, 226 can be friction welded to a base member 222 adjacently so that the structural members 224, 226 define an interface 218 therebetween. The interface 218 can be defined by contacting surfaces of the two adjacent structural members 224, 226, or the structural members 224, 226 can be separated by a space at the interface 224, 226. According to one embodiment of the invention, the space is about one-tenth the thickness T of the structural members 224, 226 as measured from the base member 222. For example, if the structural members 224, 226 are about 1 inch thick, the interface 218 can be defined by a space of about 0.1 inch between the structural members 224, 226. Further, although only two structural members 224, 226 are illustrated, it is understood that any number of structural members can be friction welded to the base member 222, such that each of the structural members defines at least one interface relative to one or more adjacent structural members.

After the first and second structural members 224, 226 are joined to the base member 222, the structural members 224, 226 can be joined by friction stir welding. For example, the members 224, 226 can be friction stir welded with a rotatable friction stir welding tool 260 that includes a pin 262 extending from a shoulder 264. With the tool 260 rotating in direction 266, the shoulder 264 (which is not shown in FIG. 9 for purposes of illustrative clarity) is urged against the structural members 224, 226 so that the pin 262 extends into the structural members 224, 226. In some cases, the pin 262 can extend through the structural members 224, 226 and into the base member 222, as shown in FIG. 10. The rotating tool 260 generates frictional heat with the structural members 224, 226 and at least partially plasticizes the structural members 224, 226. The tool 260 is moved through the structural members 224, 226 to form a friction stir weld joint 270. Friction stir welding is further described in U.S. Pat. No. 5,460,317 to Thomas, et al, the entire content of which is incorporated herein by reference.

Figure 9:
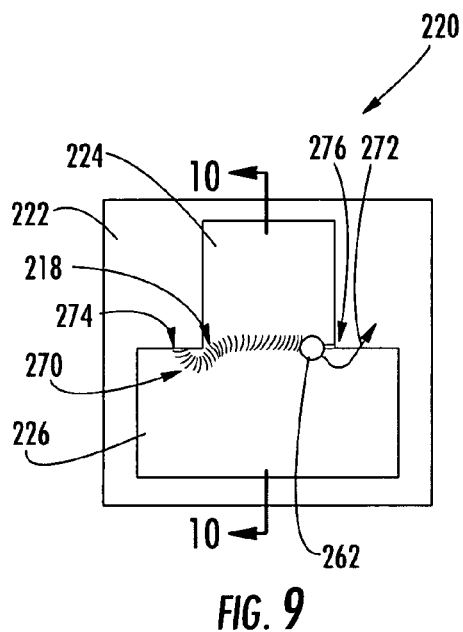
FIG. 9 is a plan view illustrating a preform according to yet another embodiment of the present invention.
Figure 10:
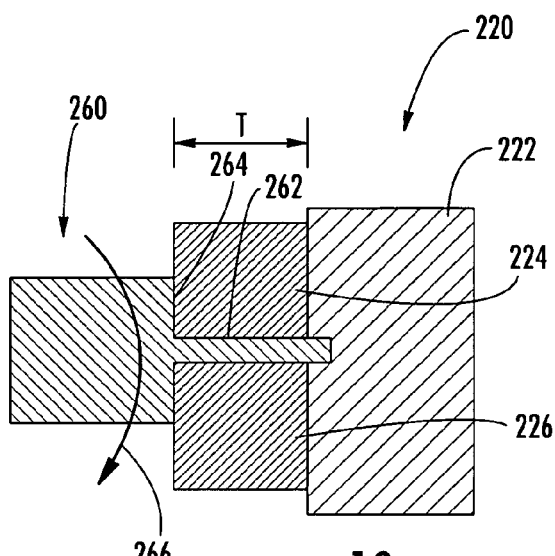
FIG. 10 is a section view illustrating the preform of FIG. 9, as seen along line 10—10 of FIG. 9.
Figure 11:
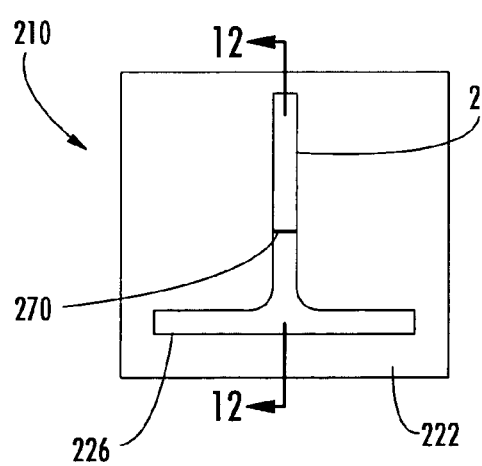
FIG. 11 is a plan view illustrating a structural assembly made with the preform of FIG. 9 according to one embodiment of the present invention.

For example, as shown in FIG. 9, the tool 260 can be moved through a path 272 that extends generally along the interface 218 of the structural members 224, 226. The path 272 need not extend parallel to or collinearly with the interface 218 but can instead extend through the structural member(s) 224, 226 proximately to the interface 218 and can intersect the interface 218 so that the tool 260 passes partially through each of the structural members 224, 226. Additionally, the path 272 can define an entry 274 and exit 276 that are displaced from the interface 218 to avoid discharge of the plasticized material from the ends of the interface 218.

Figure 12:
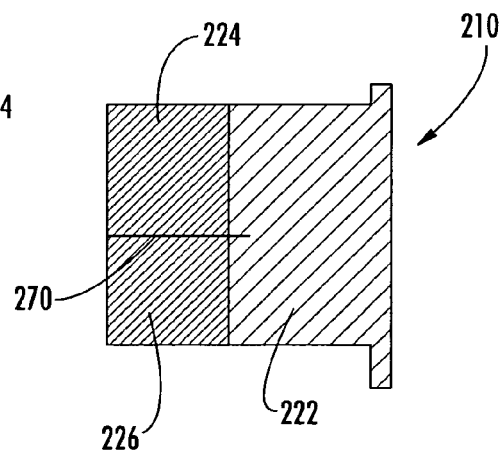
FIG. 12 is a section view of the structural assembly of FIG. 11, as seen along line 12—12 of FIG. 11.

As discussed above in connection with FIGS. 1–4, the structural members 224, 226 and the base member 222 can be joined in the configuration of a preform 220 that corresponds to the desired configuration of the structural assembly 210 to be formed therefrom. Thus, the preform 220 can be machined or otherwise trimmed or processed to predetermined dimensions corresponding to a desired configuration of the structural assembly 210, as shown in FIG. 12.

Figure 13:
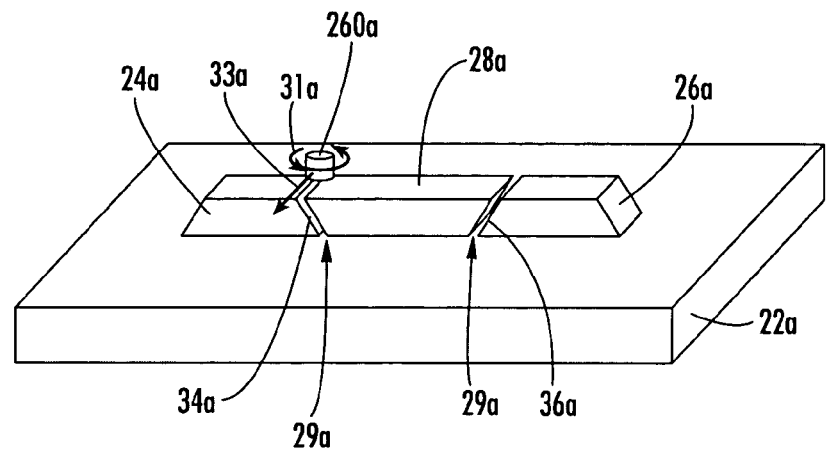
FIG. 13 is a perspective view illustrating a partially formed preform according to another embodiment of the present invention, shown during formation of the first friction stir weld joint.
Figure 14:
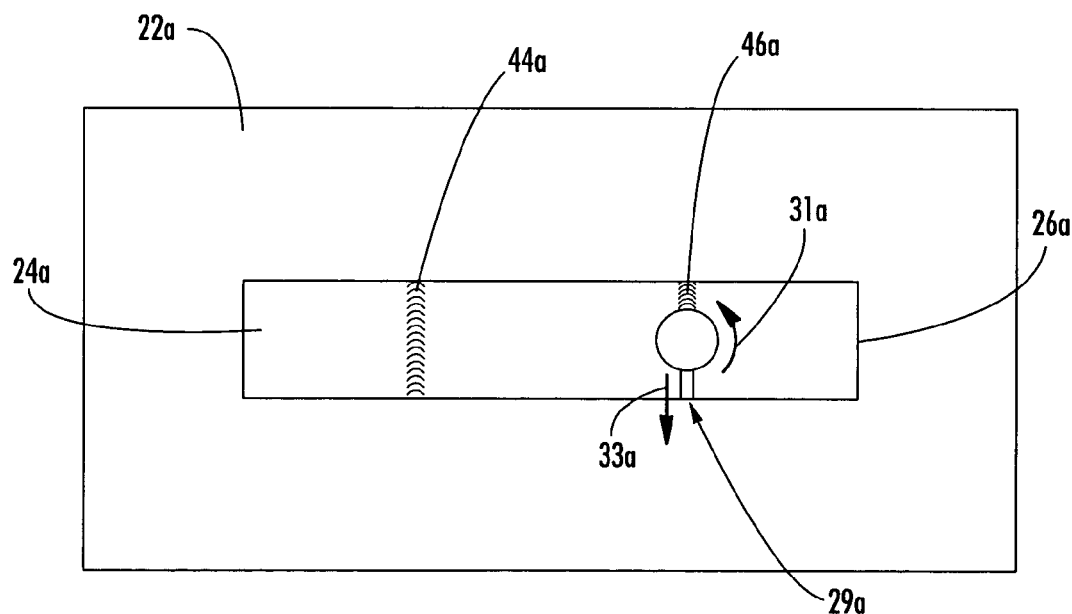
FIG. 14 is a plan view illustrating the partially formed preform of FIG. 13, shown during formation of the second friction stir weld joint.

It is also noted that the structural members can be configured in various other configurations prior to friction stir welding. For example, FIGS. 13 and 14 illustrate a configuration in which structural members 24a, 26a, 28a have been linear friction welded to base member 22a. The configuration of the structural members 24a, 26a, 28a and the base member 22a is similar to the one described above in connection with FIGS. 1–3, except that the structure member 28a shown in FIG. 13 has not been welded to the connection surfaces 34a, 36a of the structural members 24a, 26a. Instead, the structural member 28a is slightly smaller than the space 18a between the structural members 24a, 26a and therefore is not urged against the connection surfaces 34a, 36a while being friction welded to the base member 22a. Thus, small gaps 29a exist between the structural member 28a and each of the connection surfaces 34a, 36a. The structural member 28a can then be welded to the structural members 24a, 26a by friction stir welding. For example, a friction stir welding tool 260a, having a pin and shoulder as described above in connection with the welding tool 260 illustrated in FIGS. 9 and 10, can be rotated and moved generally along interfaces defined between the structural member 28a and the connection surfaces 34a, 36a of the structural members 24a, 26a to form friction stir weld joints 44a, 46a, respectively. In particular, the friction stir welding tool 260a can be urged against the third structural member 28a so that the pin of the rotating tool 260a extends at least partially through each of the third structural member 28a and one of the structural members 24a, 26a. The tool 260a is rotated in direction 31a and urged in direction 33a to plasticize the members along the interfaces thereof and form a respective one of the friction stir weld joints 44a, 46a. As shown in FIGS. 13 and 14, tool 260a can be configured so that the pin is disposed at an oblique angle relative to the connection surfaces 34a, 36a. Advantageously, as the shoulder of the tool 260a is urged against the third structural member 28a, the tool 260a can urge the third structural member 28a toward the first or second structural members 24a, 26a, thereby at least partially closing the respective gap 29a.

In addition, it is appreciated that the tool 260a can be urged and moved through the members 24a, 26a, 28a in various directions to form the friction stir weld joints 44a, 46a. For example, the tool 260a can be urged along a longitudinal direction of the members 24a, 26a, 28a, i.e., in a direction that is perpendicular to the direction 33a and parallel to the base member 22a. The friction stir weld joints 44a, 46a can be disposed to connect the portions of the interfaces of the structural members 24a, 26a, 28a that ultimately are used to form the structural assembly, though the friction stir weld joints 44a, 46a need not join the entire area of the connection surfaces 34a, 36a to the third structural member 28a.

It is appreciated that the granular structure of one or more of the members 22, 24, 26, 28, 122, 124, 126, 128a, 128b, 222, 224, 226 can be refined by the friction welding operations. Thus, in some cases, the welding of the various members can enhance the material properties thereof, e.g., by increasing the strength, ductility, or corrosion resistance of one or more of the members. Further, the members can be thermally or chemically treated before, during, or after formation of the structural assemblies. For example, the members can be heat treated individually or in combination before being joined. Alternatively, or in addition, the preforms 20, 120, 220 or structural assemblies 10, 110, 210 formed from the members can be exposed to other processing to relieve stress or improve strength. Processing can include subjecting the preforms and/or structural assemblies to a predetermined heating schedule which can include annealing, quenching, aging, solution annealing, and the like as is known in the art. Further, the preforms 20, 120, 220 or structural assemblies 10, 110, 210 can be formed after the members have been welded to change the shape of the preforms 20, 120, 220 or structural assemblies 10, 110, 210, for example, by bending the preforms 20, 120, 220 or structural assemblies 10, 110, 210 to a desired shape.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method of forming a preform for a structural assembly having a predetermined configuration, the method comprising:

reciprocatingly moving a first structural member relative to a base member and urging the first structural member against a first surface of the base member, thereby forming a plasticized region of material between the first structural member and the base member and linear friction welding the first structural member to the base member such that the first structural member is joined to the base member and defines a connection surface extending from the base member at an angle relative to the first surface of the base member; and reciprocatingly moving a second structural member relative to the base member and the first structural member and urging the second structural member against the base member and the connection surface of the first structural member, thereby forming a plasticized region of material between the second structural member and each of the base member and the first structural member and linear friction welding the second structural member to the base member and the first structural member such that the second structural member is joined to the base member and the first structural member, wherein the first and second structural members are joined to the base member in a configuration corresponding to the predetermined configuration of the structural assembly.

2. A method according to claim 1 wherein said first moving step comprises positioning the first structural member such that the connection surface of the first structural member is disposed at an oblique angle relative to the first surface of the base member, and wherein said second moving step comprises positioning the second structural member such that a correspondingly angled surface of the second structural member is friction welded to the connection surface at the oblique angle.

3. A method according to claim 1 wherein said first moving step comprises reciprocatingly moving the first structural member in opposite directions of motion, and wherein said second moving step comprises reciprocatingly moving the second structural member in opposite directions of motion parallel to the opposite directions of motion of the first structural member.

4. A method according to claim 1 further comprising welding at least three structural members to the base member, each of the structural members being friction welded to at least one of the other structural members.

5. A method according to claim 1 wherein said second moving step comprises linear friction welding the second structural member to the base member such that the second structural member extends from the base member in a direction substantially parallel to the first structural member.

6. A method according to claim 1 further comprising providing the base member and the structural members, each of the base member and the structural members being formed of at least one of the group consisting of aluminum, aluminum alloys, titanium, titanium alloys, steel, nickel-based alloys, copper-based alloys, and beryllium-based alloys.

7. A method according to claim 1 further comprising machining the preform subsequent to said moving steps to form the structural assembly defining the predetermined configuration.

8. A method according to claim 7 wherein said machining step comprises machining a portion of the base member, the structural members, and the connection material.

9. A method of forming a preform for a structural assembly having a predetermined configuration, the method comprising:

reciprocatingly moving a first structural member relative to a base member and urging the first structural member against a first surface of the base member, thereby forming a plasticized region of material between the first structural member and the base member and linear friction welding the first structural member to the base member such that the first structural member is joined to the base member and defines a connection surface extending from the base member at an angle relative to the first surface of the base member;

reciprocatingly moving a second structural member relative to the base member and urging the second structural member against the base member, thereby forming a plasticized region of material between the second structural member and the base member and linear friction welding the second structural member to the base member such that the second structural member is joined to the base member and defines a connection surface extending from the base member at an angle relative to the first surface of the base member, the connection surfaces of the first and second structural members defining a space therebetween; and reciprocatingly moving a third structural member relative to the base member and the first and second structural members and urging the third structural member against the base member in the space between the first and second structural members to form a plasticized region of material between the third structural member and each of the base member and the first and second structural members, thereby linear friction welding the third structural member to the base member and the first and second structural members such that the third structural member is joined to the base member and connects the first and second structural members, wherein the structural members are joined to the base member in a configuration corresponding to the predetermined configuration of the structural assembly.

10. A method according to claim 9 wherein said first and second moving steps comprise positioning the first and second structural members with the connection surfaces disposed at an oblique angle relative to the first surface of the base member such that the space between the connection surfaces tapers in a direction toward the base member.

11. A method according to claim 9 further comprising providing the base member and the first, second and third structural members, each of the base member and the structural members being formed of at least one of the group consisting of aluminum, aluminum alloys, titanium, titanium alloys, steel, nickel-based alloys, copper-based alloys, and beryllium-based alloys.

12. A method according to claim 9 further comprising machining the preform subsequent to said moving steps to form the structural assembly defining the predetermined configuration.

13. A method according to claim 12 wherein said machining step comprises machining a portion of the base member and the structural members.

14. A method of forming a preform for a structural assembly having a predetermined configuration, the method comprising:

reciprocatingly moving a first structural member relative to a base member and urging the first structural member against a first surface of the base member, thereby forming a plasticized region of material between the first structural member and the base member and linear friction welding the first structural member to the base member such that the first structural member is joined to the base member and defines a connection surface extending from the base member at an angle relative to the first surface of the base member;

reciprocatingly moving a second structural member relative to the base member and the first structural member and urging the second structural member against the base member, thereby forming a plasticized region of material between the second structural member and the base member and linear friction welding the second structural member to the base member such that the second structural member is joined to the base member and defines a connection surface extending from the base member at an angle relative to the first surface of the base member, the connection surfaces of the first and second structural members being directed in an opposing configuration to define an interface therebetween; and urging a rotating friction stir welding pin at least partially through the structural members to form a friction stir weld joint extending at least partially along the interface and joining the first and second structural members.

15. A method according to claim 14 wherein said first and second moving steps comprise positioning the first and second structural members with the connection surfaces disposed at a corresponding angle relative to the first surface of the base member.

16. A method according to claim 14 wherein said first and second moving steps comprise positioning the first and second structural members with the connection surfaces disposed with a space therebetween, and wherein said urging step comprises substantially filling the space with plasticized material along at least a portion of the interface.

17. A method according to claim 14 wherein said urging step comprises urging the friction stir weld tool along a path nonparallel to the interface between the structural members.

18. A method according to claim 14 further comprising providing the base member and the first and second structural members, each of the base member and the structural members being formed of at least one of the group consisting of aluminum, aluminum alloys, titanium, titanium alloys, steel, nickel-based alloys, copper-based alloys, and beryllium-based alloys.

19. A method according to claim 14 further comprising machining the preform subsequent to said moving steps to form the structural assembly defining the predetermined configuration.

20. A method according to claim 19 wherein said machining step comprises machining a portion of the base member and the structural members.

* * * * *